US012717421B2

(12) United States Patent
Alvarez et al.

(10) Patent No.: US 12,717,421 B2
(45) Date of Patent: Aug. 25, 2026

(54) MULTI-CAMERA, MULTIMODAL GESTURE DETECTION

(71) Applicant: Snap Inc., Santa Monica, CA (US)

(72) Inventors: Attila Alvarez, Vienna (AT); Márton Gergely Kajtár, Vienna (AT); David Retek, Budapest (HU); Balázs Tóth, Vienna (AT)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/827,173

(22) Filed: Sep. 6, 2024

(65) Prior Publication Data

US 2026/0072515 A1 Mar. 12, 2026

(51) Int. Cl.

| | |
|---|---|
| ***G06F 3/01*** | (2006.01) |
| ***H04N 13/156*** | (2018.01) |
| ***H04N 13/172*** | (2018.01) |
| ***H04N 13/366*** | (2018.01) |

(52) U.S. Cl.

CPC .......... *G06F 3/017* (2013.01); *H04N 13/156* (2018.05); *H04N 13/172* (2018.05); *H04N 13/366* (2018.05)

(58) Field of Classification Search

CPC .... G06F 3/017; H04N 13/156; H04N 13/172; H04N 13/366

See application file for complete search history.

(56) References Cited

U.S. PATENT DOCUMENTS

| | | | | |
|---|---|---|---|---|
| 6,118,888 A * | 9/2000 | Chino | G06F 3/017 715/705 |
| 8,548,608 B2 * | 10/2013 | Perek | H01H 13/78 700/62 |
| 9,354,709 B1 * | 5/2016 | Heller | G06F 1/1694 |
| 9,529,521 B2 * | 12/2016 | Huang | G06F 3/0485 |
| 10,120,561 B2 * | 11/2018 | Stewart | G06F 3/04883 |
| 2012/0119985 A1 * | 5/2012 | Kang | G06F 18/251 345/156 |

(Continued)

OTHER PUBLICATIONS

Park, Gabyong, "3D Hand Pose Estimation with a Single Infrared Camera via Domain Transfer Learning", 2020, IEEE International Symposium on Mixed and Augmented Reality ISMAR, Nov. 10, 2020.*

(Continued)

*Primary Examiner* — Grant Sitta
(74) *Attorney, Agent, or Firm* — SCHWEGMAN LUNDBERG & WOESSNER, P.A.

(57) ABSTRACT

A multi-camera, multimodal gesture detection system for augmented reality devices combines outputs from multiple image sensors, using different modalities, to generate fused gesture detection trigger signals and gesture detection release signals. The system processes fused trigger signals using a trigger suspension component, which suppresses false triggers based on hand velocity, position of a detected hand within a field of view of an image sensor, and visibility of key hand landmarks. The system processes fused release signals using a release suspension component, which suppresses false release signals based on hand velocity, position of a detected hand within a field of view of an image sensor, and visibility of key hand landmarks. This approach enhances gesture detection accuracy and reliability in challenging environments.

20 Claims, 6 Drawing Sheets

(56) References Cited

U.S. PATENT DOCUMENTS

| | | | | |
|---|---|---|---|---|
| 2012/0130822 | A1* | 5/2012 | Patwa | G06Q 30/0273 705/14.69 |
| 2013/0229508 | A1* | 9/2013 | Li | G06F 1/3287 348/77 |
| 2013/0328763 | A1* | 12/2013 | Latta | G06F 3/017 345/156 |
| 2015/0062004 | A1 | 3/2015 | Rafii | |
| 2016/0349850 | A1* | 12/2016 | Tsuda | G06F 3/017 |
| 2018/0053293 | A1* | 2/2018 | Ramalingam | G06T 7/33 |
| 2022/0035441 | A1* | 2/2022 | Yu | G06F 3/017 |
| 2023/0244316 | A1* | 8/2023 | Schwarz | G06N 3/08 345/156 |

OTHER PUBLICATIONS

"International Application Serial No. PCT US2025 041783, International Search Report mailed Nov. 4, 2025", 4 pgs.

"International Application Serial No. PCT US2025 041783, Written Opinion mailed Nov. 4, 2025", 6 pgs.

Leite, Diego, "Hand gesture recognition from depth and infrared Kinect data for CAVE applications interaction", Multimedia Tools and Applications, Kluwer Academic Publishers, Boston, US, vol. 76, No. 20, Sep. 23, 2016, 33 pgs.

Park, Gabyong, "3D Hand Pose Estimation with a Single Infrared Camera via Domain Transfer Learning", IEEE International Symposium on Mixed and Augmented Reality ISMAR, Nov. 10, 2020, 12 pgs.

Park, Gabyong, "3D Hand Tracking in the Presence of Excessive Motion Blur", IEEE Transactions on Visualization and Computer Graphics, IEEE, USA, vol. 26, No. 5, Feb. 12, 2020, 11 pgs.

Streli, Paul, "HOOV Hand Out-Of-View Tracking for Proprioceptive Interaction using Inertial Sensing", Proceedings ofthe 2023 ACM Asia Conference on Computer and Communications Security, ACMPUB27, New York, NY, USA, Apr. 19, 2023, 16 pgs.

* cited by examiner

END-USER, PERFORMING A HAND GESTURE

MULTI-CAMERA, MULTIMODAL GESTURE DETECTION

TECHNICAL FIELD

The present application relates to the field of extended reality systems, including augmented reality, virtual reality, and mixed reality environments. More specifically, the subject matter of the present application pertains to multimodal, multi-camera gesture detection systems for extended reality devices, with a focus on adaptive suppression mechanisms for improving the accuracy and reliability of hand gesture recognition and tracking.

BACKGROUND

Extended reality systems and devices, encompassing augmented reality, virtual reality, and mixed reality, have become increasingly prevalent in various applications, from entertainment to professional use. These immersive technologies often rely on user input and interaction methods that go beyond traditional interfaces like keyboards or touchscreens. Hand gestures have emerged as a natural and intuitive way for users to interact with extended reality environments, allowing for more immersive and seamless experiences across the spectrum of virtual and augmented realities.

Hand gesture recognition in augmented reality systems typically involves two primary components: hand tracking and gesture detection. Hand tracking algorithms are responsible for detecting and tracking the position, orientation, and movement of the user's hands in real-time within the augmented reality environment. These algorithms often employ computer vision techniques and deep learning models to identify hands within the camera's view and track key points such as joints and fingertips.

Gesture detection algorithms, on the other hand, focus on recognizing specific hand shapes or movements as predefined hand gestures. These algorithms analyze the tracked hand's position, orientation, and movement to match them against a library of predefined hand gestures. Machine learning models are frequently employed to improve the accuracy of hand gesture recognition.

In augmented reality systems, hand tracking and gesture detection algorithms typically operate in parallel and are highly integrated. The hand tracking algorithm runs continuously to provide real-time data about the hands, which the gesture detection algorithm then uses to identify specific gestures. This concurrent operation ensures a smooth and responsive user experience in the augmented reality environment.

As augmented reality devices evolve, they often incorporate multiple sensors and cameras to capture a more comprehensive view of the user's environment and interactions. These multimodal, multi-camera systems aim to provide more accurate and robust hand tracking and gesture recognition capabilities across various usage scenarios and environmental conditions.

BRIEF DESCRIPTION OF THE DRAWINGS

In the drawings, which are not necessarily drawn to scale, like numerals may describe similar components in different views. To easily identify the discussion of any particular element or operation, the most significant digit or digits in a reference number refer to the figure number in which that element is first introduced. Some non-limiting examples are illustrated in the figures of the accompanying drawings in which.

DETAILED DESCRIPTION

Described herein are techniques for hand gesture detection in multimodal, multi-camera extended reality environments, including augmented reality, virtual reality, and mixed reality systems. The presented techniques employ a novel approach to gesture detection by implementing adaptive suppression mechanisms that enhance the accuracy and reliability of both hand gesture triggers and releases. Here, a hand gesture trigger refers to the initiation or beginning of a specific hand gesture, such as forming a particular hand shape or starting a predefined motion, which the system interprets as the commencement of a user input or command. A gesture release, on the other hand, denotes the termination or completion of a gesture, typically involving the relaxation of the hand or the cessation of a specific motion, which the system recognizes as the conclusion of the user's input. By utilizing multiple sensor modalities and intelligent signal validation techniques, the system addresses common challenges in hand gesture detection, such as high velocity movements, field of view limitations, and landmark visibility issues. The methods described herein provide a more seamless and intuitive user interaction experience in extended reality applications by minimizing false triggers and unintended releases, thereby improving the overall responsiveness and user satisfaction in hand gesture-based interfaces. In the following description, for purposes of explanation, numerous specific details are set forth to provide a thorough understanding of the various aspects of different embodiments of the present invention. It will be evident, however, to one skilled in the art, that the present invention may be practiced with varying combinations of the several features set forth, and in some cases without all of the specific features and details set forth herein.

Figure 1:
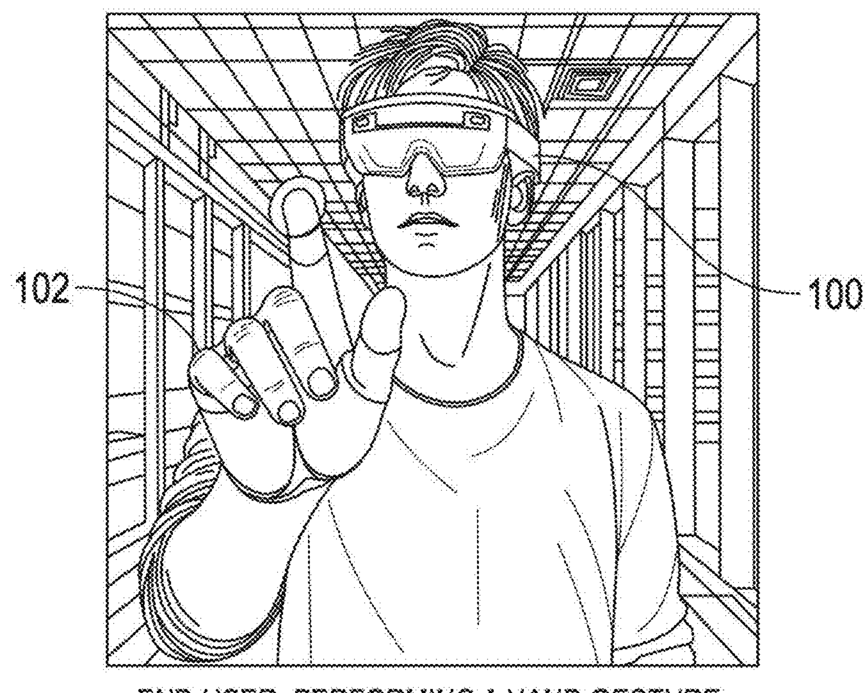
FIG. 1 is a diagram illustrating an end-user performing a hand gesture and potential challenges in gesture detection, including high hand velocity, detection near field of view edges, and key landmark visibility issues.
Figure 1:
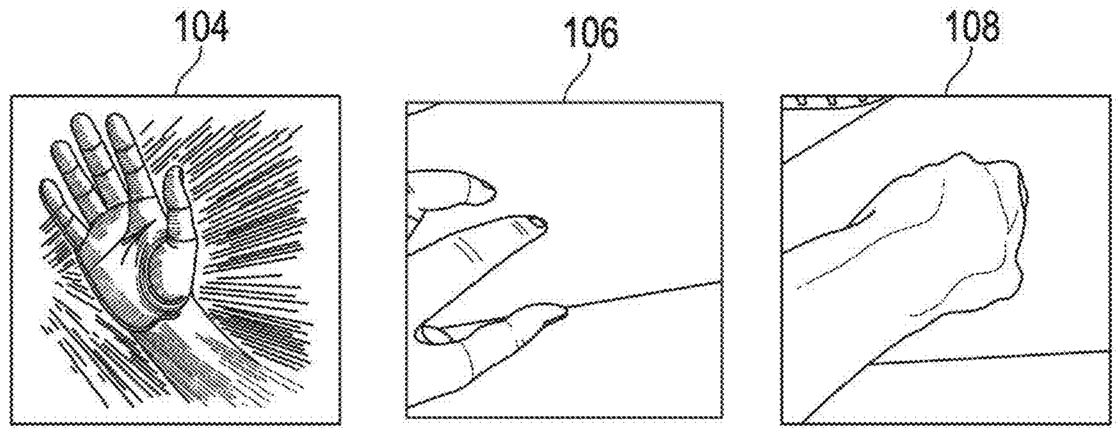

In extended reality environments, including augmented reality, virtual reality, and mixed reality systems, hand gesture detection and recognition plays an important role in enabling natural and intuitive user interactions. As illustrated in FIG. 1, an augmented reality device 100 is designed to detect and interpret hand gestures performed by a user's hand 102. This augmented reality device 100 employs a multimodal and multi-camera approach to capture and process hand movements, which offers potential benefits in terms of accuracy and robustness, but also introduces complexity to the hand gesture detection process.

The multi-camera approach in augmented reality systems utilizes multiple cameras to capture a comprehensive view of the user's environment and enhance hand gesture detection accuracy. This setup employs cameras with different specifications to improve the robustness of hand tracking and gesture recognition. For example, the system may incorporate a combination of RGB cameras and infrared cameras, each offering distinct advantages for hand gesture detection in various lighting conditions. By leveraging multiple cameras, the system can mitigate issues such as limited field of view and varying depth perception, while also enabling more accurate three-dimensional (3D) hand tracking.

The multimodal aspect refers to the use of different types of sensors and detection algorithms to capture hand movements. In the context of this disclosure, the term "multimodal" means that there are multiple detection algorithms in play, where the individual signals received and processed according to a specific algorithm may differ from one mode to the next, based on differences in the hardware-based sensors. For example, RGB cameras capture information in the visible spectrum, while infrared cameras detect heat signatures, allowing for different types of hand detection in various environmental conditions. Similarly, different image sensors may be paired with differing lenses, each having different imaging characteristics. These varied hardware configurations require different modalities for detecting hand gestures, as each sensor type may excel in capturing specific aspects of hand movement or perform differently under various conditions.

At any given moment, the system must process and reconcile multiple images obtained from different cameras, each with its own unique perspective and characteristics. The system selects a representative camera for every modality where the hand is visible based on various criteria and applies a modality-specific detection method for every modality where the hand is visible. Each modality (e.g., visible light, infrared) responds differently to changes in the environment, adding another layer of complexity to the integration and interpretation of these diverse data streams.

As the user moves their hand within the combined field of view of the multiple cameras, the system must seamlessly transition between different cameras and modalities, ensuring consistent and accurate gesture detection. This requirement further complicates the overall problem of reliable hand gesture recognition with multimodal, multi-camera, extended reality environments.

The accuracy and reliability of hand tracking and gesture detection face several challenges, as illustrated in FIG. 1. First, high hand velocity causes motion blur, as illustrated with reference number 104. Rapid hand movements can result in blurred images, making it difficult for hand tracking and gesture detection algorithms to accurately detect and track the hand's position and shape. This can lead to unreliable hand tracking and gesture detection, potentially causing the system to miss or misinterpret user inputs.

Additionally, as shown with reference number 106, accuracy issues may occur at the edges of the field of view. As a user's hand moves towards the periphery of the camera's view, the system's ability to accurately track the hand and recognize gestures may be compromised due to partial visibility and potential distortions that occur at the edges of the camera's field of view.

Reliability issues may also occur when key landmarks are not visible, as shown with reference number 108. In certain hand poses or orientations, critical points on the hand, such as specific joints or fingertips, may be obscured or difficult for the system to identify accurately. This can lead to uncertainty in the hand's position and shape, affecting the system's ability to recognize specific gestures.

In the context of hand gesture detection in extended reality (XR) environments, both false trigger detections and false release detections can significantly impact the user experience, with false releases generally being more problematic. When a false trigger occurs, it may lead to unintended actions such as selecting and grabbing the wrong AR object for manipulation in a crowded scene, unintentionally launching an app from an application menu or user interface, or erroneously setting parameters in a property menu. The system's preference for not verifying a triggering event if it has a low probability score can be beneficial, as it encourages users to make more precise hand gestures, ultimately improving the overall reliability of the gesture detection system. Nonetheless, the potential for disruption in user interaction due to false triggers should not be underestimated, as it can lead to user frustration and reduced efficiency in certain scenarios.

In some scenarios, false release detections also have a significant negative impact on the user experience, particularly when they occur due to the hand briefly leaving the field of view. This problem is especially acute in multimodal, multi-camera environments where the hand may temporarily move outside the combined field of view of the cameras.

For example, consider a scenario where a user is attempting to reposition a virtual content item in 3D space using a hand gesture. If the system falsely detects a release when the hand momentarily leaves the field of view, even for a very short time, it can result in the misplacement of the virtual content item. This erroneous release forces the user to re-initiate the entire gesture sequence to correct the unintended placement, significantly disrupting the flow of interaction and potentially causing frustration.

The problem is particularly pronounced when the hand briefly becomes undetectable due to being out of the field of view. In a multi-camera setup, there may be gaps or blind spots in the combined field of view where the hand can temporarily disappear. This can occur during natural hand movements, especially when the user is unaware of the exact boundaries of the system's detection range. When the hand re-enters the field of view, the system might interpret this as a new gesture rather than a continuation of the ongoing interaction, leading to unintended releases.

To address these technical challenges and others, the present techniques described herein provide a novel approach to hand gesture detection in multimodal, multi-camera extended reality environments. The solution employs adaptive suppression mechanisms that enhance the accuracy and reliability of both gesture triggers and gesture releases.

The solution employs a multimodal, multi-camera approach to hand gesture detection in extended reality environments. This system utilizes multiple image sensors of different types to capture hand movements from various perspectives and modalities. The captured data is processed through a gesture detection component that combines outputs from hand gesture detectors associated with different modalities to generate a fused gesture detection signal.

Each detector analyzes an image along with sensor data to generate a metric or score, representing the probability that a particular hand gesture has been triggered or released. The system applies modality-specific detection methods for every modality where the hand is visible. The individual scores from each modality are combined to generate a fused gesture detection signal, which may be implemented as a weighted sum with weights learned using machine learning algorithms.

To enhance accuracy and reliability, the system implements adaptive suppression mechanisms for both gesture triggers and gesture releases. These mechanisms address common challenges in hand tracking and gesture detection, such as high velocity movements, field of view limitations, and landmark visibility issues.

For gesture triggers, the system suppresses potential false triggers based on several criteria. It suppresses triggers when the hand's velocity exceeds a predetermined threshold to account for motion blur, which can occur during rapid hand movements and lead to unreliable detection.

The system also suppresses triggers when the hand is detected within predefined regions around the edges of the image sensors' fields of view, where gesture detection accuracy may be reduced due to partial visibility of the hand. Additionally, triggers are suppressed when specific joints or fingertips important for recognizing the particular gesture are not visible, ensuring that gestures are only detected when there is sufficient confidence in the hand's pose and configuration.

Similarly, for gesture releases, the system employs suppression mechanisms to prevent unintended release detections. Releases are suppressed when hand velocity is too high, mirroring the approach used for trigger suppression to account for motion blur.

The system also suppresses releases when the hand is near the edges of the field of view, where detection accuracy may be compromised. Furthermore, releases are suppressed when important landmarks for the gesture being released are not visible, ensuring that the system maintains an active gesture state until it can confidently determine that the gesture has been completed. These suppression mechanisms work in tandem to minimize false triggers and unintended releases, thereby improving the overall responsiveness and user satisfaction in gesture-based interfaces for extended reality applications.

Consistent with some examples, to specifically address the issue of false releases when a hand temporarily leaves the field of view, the system implements a suppression mechanism that operates on the fused gesture detection signal when it indicates a release. This suppression mechanism works to "correct" the output of the combined detectors as represented by the fused or combined signal. When the fused signal indicates a potential release, the system maintains an active gesture state for a predetermined time period if the hand moves outside the combined field of view of the cameras. This approach helps prevent false releases due to brief occlusions or movements outside the detection range, thereby improving the continuity and reliability of gesture-based interactions in extended reality environments. By suppressing the release signal for a short predetermined duration, the system accounts for the possibility that a hand has temporarily left the field of view during an ongoing hand gesture, rather than immediately interpreting it as a gesture completion. The full details of the solution, including all of its aspects and advantages, are set forth in connection with the description of the several figures that follows.

Figure 2:
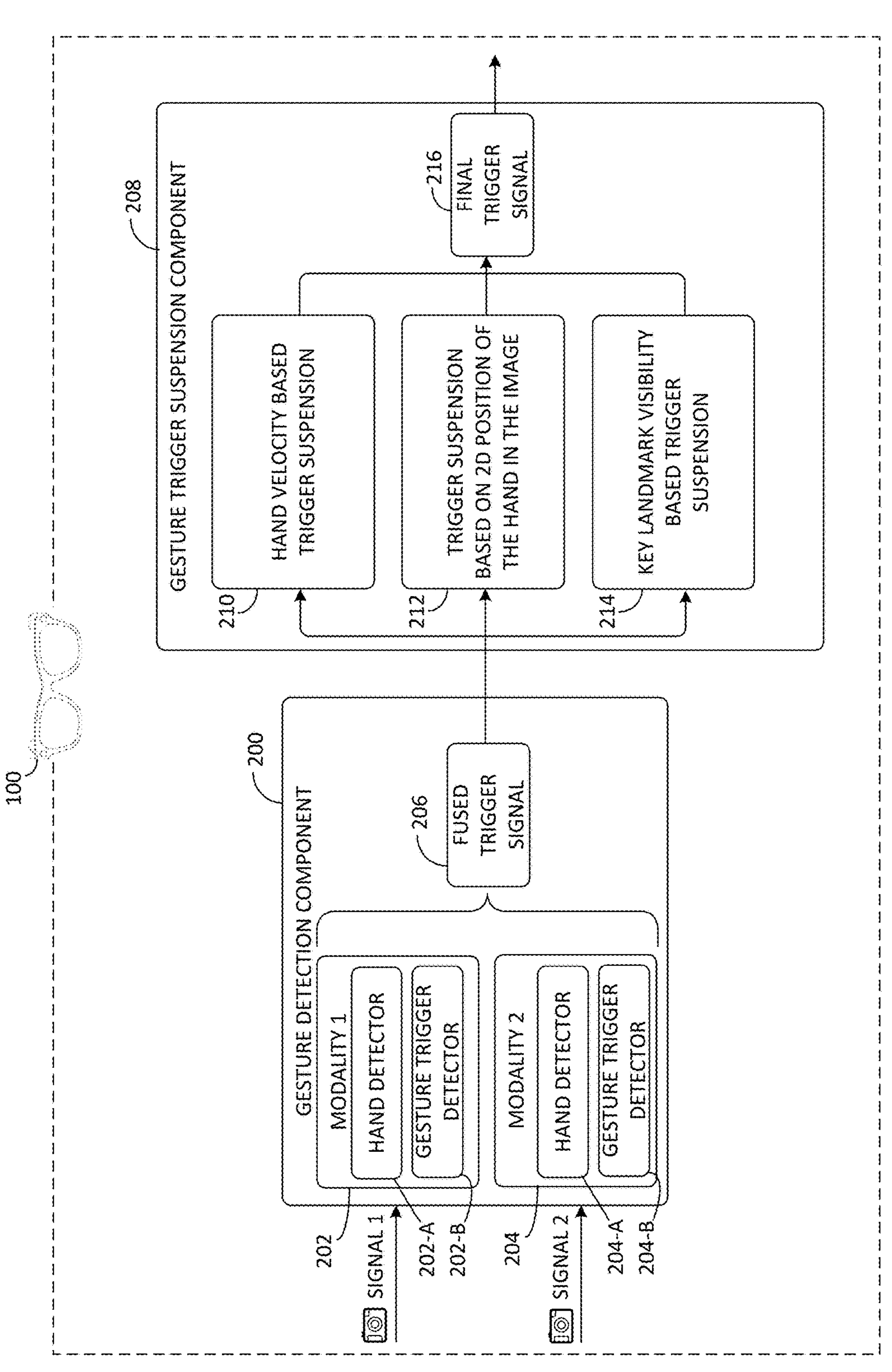
FIG. 2 is a block diagram depicting a gesture detection system with multiple modalities and a gesture trigger suspension component, showing the process flow from input signals to the final trigger signal, consistent with some embodiments.

FIG. 2 is a block diagram depicting a gesture detection system with multiple modalities and a gesture trigger suspension component, showing the process flow from input signals to the final trigger signal, consistent with some embodiments. This system is a component of the augmented reality device 100.

The gesture detection component 200 of the augmented reality device 100 is designed to process and analyze hand movements captured by multiple sensors to detect various types of hand gestures. These gestures can include actions such as pinching, swiping, pointing, grabbing, waving, rotating, and spreading fingers. Each gesture has a distinct beginning (trigger) and ending (release), where the trigger represents the initiation of a specific hand gesture, and the release denotes its completion.

The system employs a multimodal approach, utilizing different types of sensors such as RGB cameras and infrared cameras. For each modality, the system applies a modality-specific detection method to analyze the hand movements captured in the images. As shown in FIG. 2, the gesture detection component 200 includes separate hand detectors (e.g., 202-A, 204-A) and gesture trigger detectors (e.g., 202-B, 204-B) for each modality.

Each detector generates an output (e.g., a number or score) representing the probability that a particular hand gesture has been triggered. These individual scores from the different modalities are then combined to generate a fused trigger signal 206. This fused signal represents the overall probability that the system has detected the beginning of a specific hand gesture.

In some examples, the gesture detection component 200 is capable of outputting multiple such signals simultaneously, each representing the likelihood of a different type of hand gesture being performed by the end-user. These signals are then processed by the gesture trigger suspension component 208, which implements various suppression mechanisms to enhance the accuracy and reliability of gesture detection.

The gesture trigger suspension component 208 includes several sub-components that work together to suppress potential false triggers. These include hand velocity-based trigger suspension 210, trigger suspension based on the 2D position of the hand in the image 212, and key landmark visibility-based trigger suspension 214. These mechanisms help address common challenges in hand tracking and gesture detection, such as motion blur from rapid hand movements, reduced accuracy at the edges of the field of view, and uncertainty due to obscured key hand landmarks.

The gesture trigger suspension component 208 is a part of the gesture detection system that works to enhance the accuracy and reliability of gesture recognition by suppressing potential false triggers. This component 208 consists of several sub-components, each designed to address specific challenges in hand tracking and gesture detection.

The hand velocity-based trigger suspension sub-component 210 is responsible for suppressing potentially erroneous fused trigger signals when the system determines that a hand has exceeded a predetermined velocity threshold. This mechanism helps to address the issue of motion blur caused by rapid hand movements, which can lead to unreliable hand tracking and gesture detection. To determine the velocity of the hand, the system utilizes the hand tracking data provided by the hand detectors (e.g., 202-A, 204-A) for each modality. By analyzing the change in position of key hand landmarks (such as joints or fingertips) over consecutive frames, the system can calculate the hand's velocity. This calculation may involve techniques such as:

Frame-to-frame displacement: Measuring the distance traveled by specific hand landmarks between consecutive frames.

Time-based velocity calculation: Dividing the displacement by the time interval between frames.

Smoothing and filtering: Applying algorithms to reduce noise and improve the accuracy of velocity estimates.

Once the hand velocity is determined, the system compares it to a predetermined velocity threshold.

This threshold is system-dependent and is based on the velocity at which gesture detection becomes unreliable due to motion blur. If the calculated hand velocity exceeds this threshold, the hand velocity-based trigger suspension sub-component 210 will suppress the fused trigger signal.

The suppression mechanism may operate in several alternative ways to address high-velocity hand movements. One approach involves temporarily ignoring or discarding high-probability trigger signals when the system detects hand velocity exceeding the predetermined threshold. Alternatively, the system may adjust the confidence score of the fused trigger signal based on the detected velocity, effectively reducing the likelihood of a trigger being recognized during rapid hand movements. Another method could implement a time-based cooldown period after high-velocity movements are detected, during which the system refrains from processing new trigger signals. This cooldown period allows the system to stabilize and reduces the chances of false triggers caused by motion blur or rapid transitions between hand poses. These approaches, either individually or in combination, help the gesture detection system maintain accuracy and reliability in the presence of fast hand movements, enhancing the overall user experience in the AR environment. By implementing this velocity-based suppression, the system can reduce false triggers that might occur due to rapid hand movements, improving the overall accuracy and reliability of gesture detection in the AR environment.

The trigger suspension based on the 2D position of the hand in the image (sub-component 212) works to suppress trigger signals when the hand is detected within predefined regions around the edges of the image sensors' fields of view. This mechanism addresses the issue of reduced accuracy at the edges of the field of view, where gesture detection may be compromised due to partial visibility of the hand.

The key landmark visibility-based trigger suspension (sub-component 214) suppresses trigger signals when specific joints or fingertips crucial for recognizing a particular gesture are not visible. This helps to ensure that gestures are only detected when there is sufficient confidence in the hand's pose and configuration, addressing the challenge of uncertainty due to obscured key hand landmarks.

Together, these sub-components of the gesture trigger suspension component 208 work to refine the fused trigger signal, 206 producing a final trigger signal 216 that represents a more accurate indication of whether a hand gesture has been initiated. This approach helps to minimize false triggers and improve the overall user experience in gesture-based interactions within the AR environment.

Figure 3:
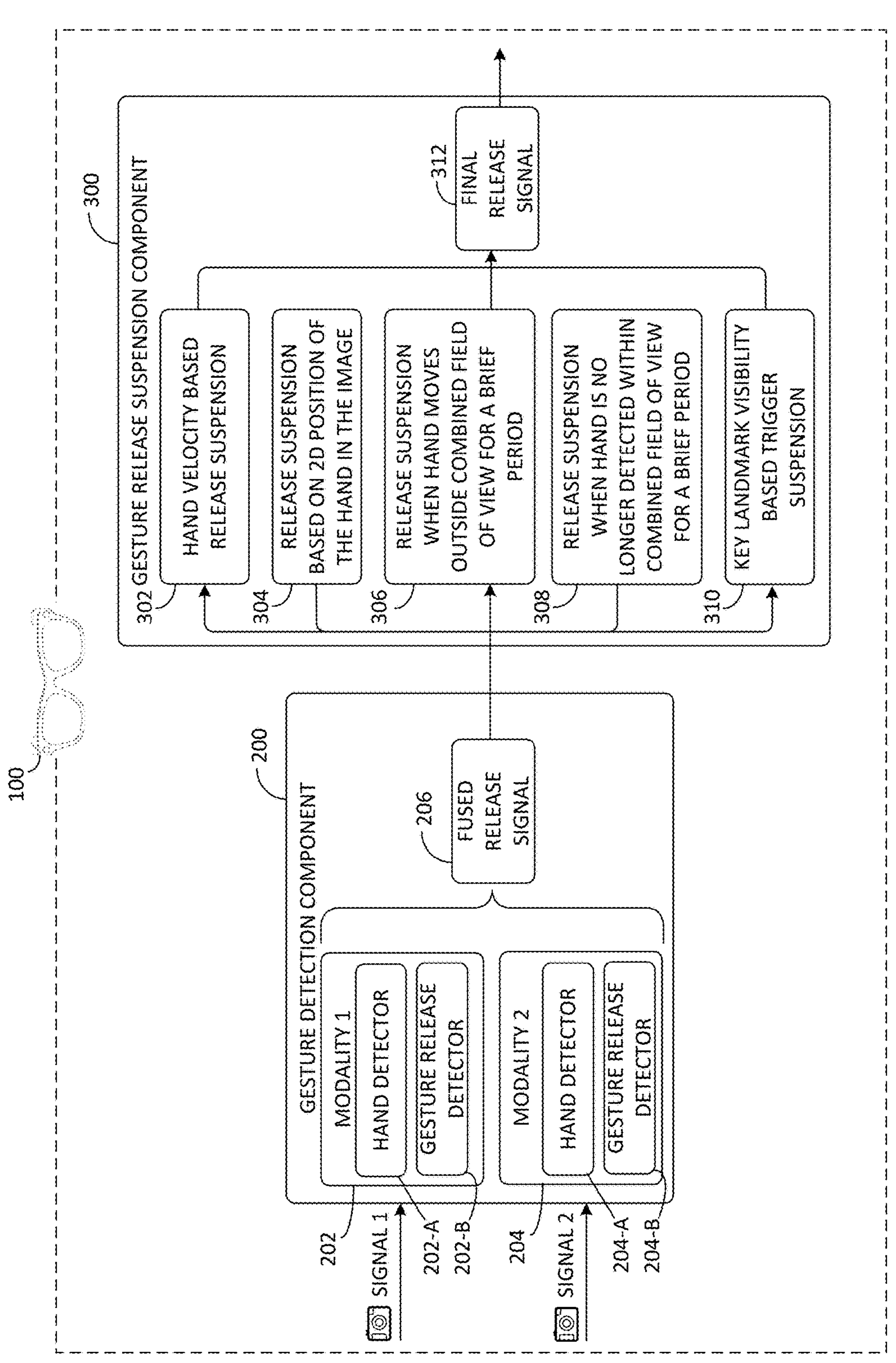
FIG. 3 is a block diagram illustrating a gesture detection system with multiple modalities and a gesture release suspension component, showing the process flow from input signals to the final release signal, consistent with some embodiments.

FIG. 3 is a block diagram depicting a gesture detection system with multiple modalities and a gesture release suspension component, showing the process flow from input signals to the final release signal, consistent with some embodiments. This system is a component of the augmented reality device 100.

The gesture detection component 200 of the augmented reality device 100 processes and analyzes hand movements captured by multiple sensors to detect various types of hand gestures, including their completion or release. As shown in FIG. 3, the gesture detection component 200 includes separate hand detectors (e.g., 202-A, 204-A) and gesture release detectors (e.g., 202-B, 204-B) for each modality.

The system employs a multimodal approach, utilizing different types of sensors such as RGB cameras and infrared cameras. For each modality, the system applies a modality-specific detection method to analyze the hand movements captured in the images. Each detector generates an output (e.g., a number or score) representing the probability that a particular hand gesture has been released or completed.

These individual scores from the different modalities are then combined to generate a fused release signal 206. This fused signal represents the overall probability that the system has detected the ending of a specific hand gesture. In some examples, the gesture detection component 200 is capable of outputting multiple such signals simultaneously, each representing the likelihood of a different type of hand gesture being completed by the end-user.

The fused release signal(s) are then processed by the gesture release suspension component 300, which implements various suppression mechanisms to enhance the accuracy and reliability of gesture release detection. The gesture release suspension component 300 includes several sub-components that work together to suppress potential false releases.

The hand velocity-based release suspension sub-component 302 is responsible for suppressing potentially erroneous fused release signals when the system determines that a hand has exceeded a predetermined velocity threshold. This mechanism helps to address the issue of motion blur caused by rapid hand movements, which can lead to unreliable hand tracking and gesture detection.

The release suspension based on the 2D position of the hand in the image (sub-component 304) works to suppress release signals when the hand is detected within predefined regions around the edges of the image sensors' fields of view. This mechanism addresses the issue of reduced accuracy at the edges of the field of view, where gesture detection may be compromised due to partial visibility of the hand.

Sub-components 306 and 308 address different issues related to false releases when a hand temporarily becomes undetectable. Sub-component 306 maintains an active gesture state for a predetermined time period when the hand moves outside the combined field of view of the cameras. This helps prevent false releases due to brief occlusions or movements outside the detection range.

Sub-component 308, on the other hand, maintains an active gesture state for a predetermined time period when the hand is no longer detected by the hand tracker inside the combined field of views of the cameras. This addresses situations where the hand may still be within the field of view but is temporarily undetectable due to other factors. Both components work to improve the continuity and reliability of gesture-based interactions in XR environments by suppressing potential false releases during brief periods of hand invisibility or undetectability.

The key landmark visibility-based release suspension, sub-component 310, suppresses release signals when specific joints or fingertips used for recognizing the completion of a particular gesture are not visible. This helps to ensure that gesture releases are only detected when there is sufficient confidence in the hand's pose and configuration, addressing the challenge of uncertainty due to obscured key hand landmarks.

Together, these sub-components of the gesture release suspension component 300 work to refine the fused release signal, producing a final release signal 312 that represents a more accurate indication of whether a hand gesture has been completed. This approach helps to minimize false releases and improve the overall user experience in gesture-based interactions within the AR environment.

The gesture release suspension component 300 operates on the fused gesture detection signal when it indicates a release, working to "correct" the output of the combined detectors as represented by the fused or combined signal. When the fused signal indicates a potential release, the system maintains an active gesture state for a predetermined time period if the hand moves outside the combined field of view of the cameras. This approach helps prevent false releases due to brief occlusions or movements outside the detection range, thereby improving the continuity and reliability of gesture-based interactions in extended reality environments.

System With Head-Wearable Apparatus

Figure 4:
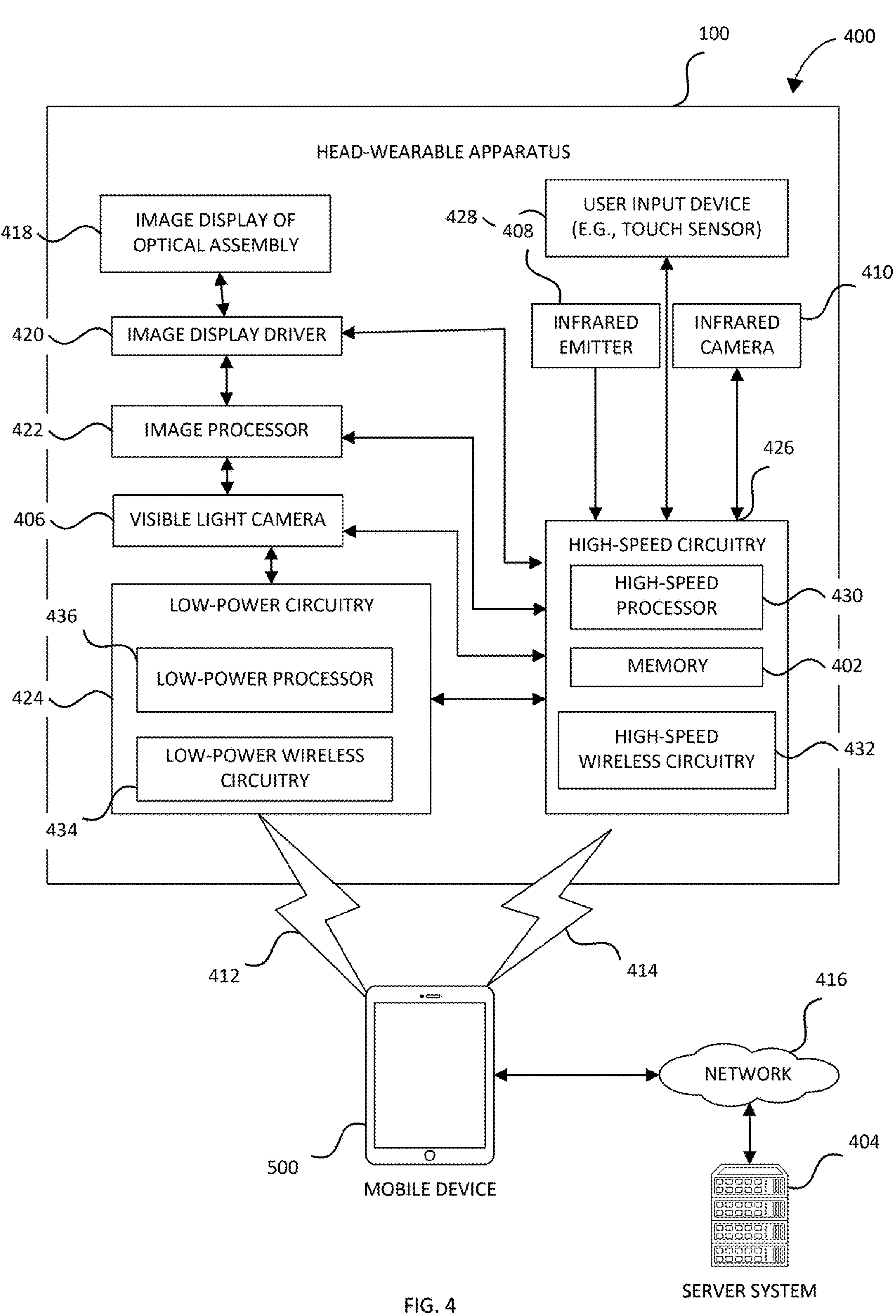
FIG. 4 is a block diagram showing the components of a head-wearable apparatus, including various sensors, processors, and communication interfaces, as well as its interaction with a mobile device and server system, consistent with some embodiments.

FIG. 4 is a high-level functional block diagram of an example head-wearable apparatus 100 communicatively coupled to a mobile device 500 and various server systems 404 via various networks 416.

The head-wearable apparatus 100 includes one or more cameras, each of which may be, for example, a visible light camera 406, an infrared emitter 408, and an infrared camera 410.

The mobile device 500 connects with head-wearable apparatus 100 using both a low-power wireless connection 412 and a high-speed wireless connection 414. The mobile device 500 is also connected to the server system 404 and the network 416.

The head-wearable apparatus 100 further includes two image displays of the image display of optical assembly 418. The two image displays of optical assembly 418 include one associated with the left lateral side and one associated with the right lateral side of the head-wearable apparatus 100. The head-wearable apparatus 100 also includes an image display driver 420, an image processor 422, low-power circuitry 424, and high-speed circuitry 426. The image display of optical assembly 418 is for presenting images and videos, including an image that can include a graphical user interface to a user of the head-wearable apparatus 100.

The image display driver 420 commands and controls the image display of optical assembly 418. The image display driver 420 may deliver image data directly to the image display of optical assembly 418 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 428 (e.g., touch sensor or push button), including an input surface on the head-wearable apparatus 100. The user input device 428 (e.g., touch sensor or push button) is to receive from the user an input selection to manipulate the graphical user interface of the presented image.

The components shown in FIG. 4 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right visible light cameras 406 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 100 includes a memory 402, which stores instructions to perform a subset, or all the functions described herein. The memory 402 can also include storage device.

As shown in FIG. 4, the high-speed circuitry 426 includes a high-speed processor 430, a memory 402, and high-speed wireless circuitry 432. In some examples, the image display driver 420 is coupled to the high-speed circuitry 426 and operated by the high-speed processor 430 to drive the left and right image displays of the image display of optical assembly 418. The high-speed processor 430 may be any processor capable of managing high-speed communications and operation of any general computing system needed for the head-wearable apparatus 100. The high-speed processor 430 includes processing resources needed for managing high-speed data transfers on a high-speed wireless connection 414 to a wireless local area network (WLAN) using the high-speed wireless circuitry 432. In certain examples, the high-speed processor 430 executes an operating system such as a LINUX operating system or other such operating system of the head-wearable apparatus 100, and the operating system is stored in the memory 402 for execution. In addition to any other responsibilities, the high-speed processor 430 executing a software architecture for the head-wearable apparatus 100 is used to manage data transfers with high-speed wireless circuitry 432. In certain examples, the high-speed wireless circuitry 432 is configured to implement Institute of Electrical and Electronic Engineers (IEEE) 802.11 communication standards, also referred to herein as WI-FI®. In some examples, other high-speed communications standards may be implemented by the high-speed wireless circuitry 432.

The low-power wireless circuitry 434 and the high-speed wireless circuitry 432 of the head-wearable apparatus 100 can include short-range transceivers (e.g., Bluetooth™, Bluetooth LE, Zigbee, ANT+) and wireless wide, local, or wide area network transceivers (e.g., cellular or WI-FI®). Mobile device 500, including the transceivers communicating via the low-power wireless connection 412 and the high-speed wireless connection 414, may be implemented using details of the architecture of the head-wearable apparatus 100, as can other elements of the network 416.

The memory 402 includes any storage device capable of storing various data and applications, including, among other things, camera data generated by the left and right visible light cameras 406, the infrared camera 410, and the image processor 422, as well as images generated for display by the image display driver 420 on the image displays of the image display of optical assembly 418. While the memory 402 is shown as integrated with high-speed circuitry 426, in some examples, the memory 402 may be an independent standalone element of the head-wearable apparatus 100. In certain such examples, electrical routing lines may provide a connection through a chip that includes the high-speed processor 430 from the image processor 422 or the low-power processor 436 to the memory 402. In some examples, the high-speed processor 430 may manage addressing of the memory 402 such that the low-power processor 436 will boot the high-speed processor 430 any time that a read or write operation involving memory 402 is needed.

As shown in FIG. 4, the low-power processor 436 or high-speed processor 430 of the head-wearable apparatus 100 can be coupled to the camera (visible light camera 406, infrared emitter 404, or infrared camera 410), the image display driver 420, the user input device 428 (e.g., touch sensor or push button), and the memory 402.

The head-wearable apparatus 100 is connected to a host computer. For example, the head-wearable apparatus 100 is paired with the mobile device 500 via the high-speed wireless connection 414 or connected to the server system 404 via the network 416. The server system 404 may be one or more computing devices as part of a service or network computing system, for example, that includes a processor, a memory, and network communication interface to communicate over the network 416 with the mobile device 500 and the head-wearable apparatus 100.

The mobile device 500 includes a processor and a network communication interface coupled to the processor. The network communication interface allows for communication over the network 416, low-power wireless connection 412, or high-speed wireless connection 414. Mobile device 500 can further store at least portions of the instructions in the memory of the mobile device 500 memory to implement the functionality described herein.

Output components of the head-wearable apparatus 100 include visual components, such as a display such as a liquid crystal display (LCD), a plasma display panel (PDP), a light-emitting diode (LED) display, a projector, or a waveguide. The image displays of the optical assembly are driven by the image display driver 420. The output components of the head-wearable apparatus 100 further include acoustic components (e.g., speakers), haptic components (e.g., a vibratory motor), other signal generators, and so forth. The input components of the head-wearable apparatus 100, the mobile device 500, and server system 404, such as the user input device 428, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 100 may also include additional peripheral device elements. Such peripheral device elements may include sensors and display elements integrated with the head-wearable apparatus 100. For example, peripheral device elements may include any I/O components including output components, motion components, position components, or any other such elements described herein.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 412 and high-speed wireless connection 414 from the mobile device 500 via the low-power wireless circuitry 434 or high-speed wireless circuitry 432.

Machine Architecture

Figure 5:
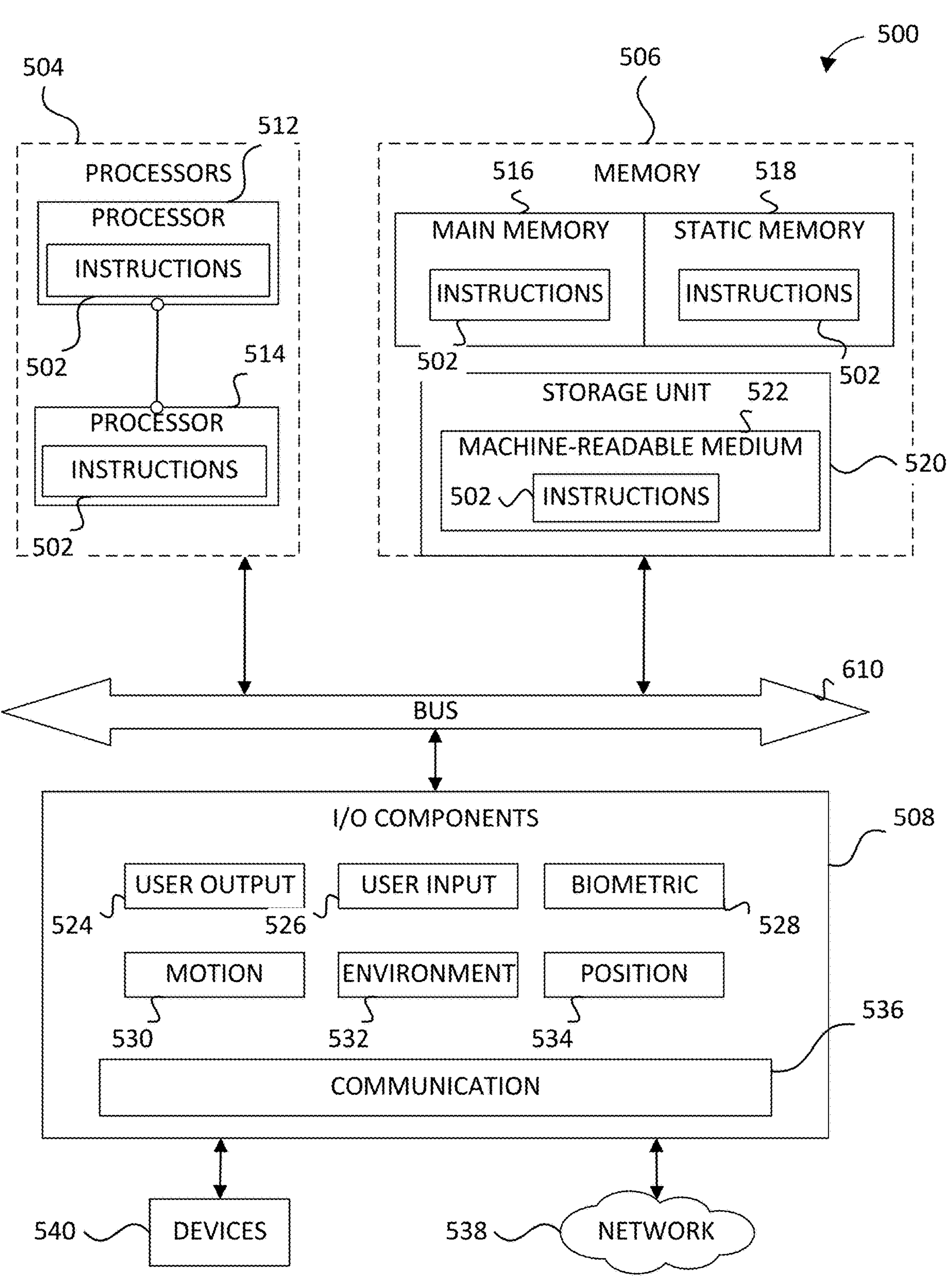
FIG. 5 is a block diagram illustrating the hardware architecture of a computing device, including processors, memory, storage, and I/O components, consistent with some embodiments.

FIG. 5 is a diagrammatic representation of the machine 500 within which instructions 502 (e.g., software, a program, an application, an applet, an app, or other executable code) for causing the machine 500 to perform any one or more of the methodologies discussed herein may be executed. For example, the instructions 502 may cause the machine 500 to execute any one or more of the methods described herein. The instructions 502 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 502, sequentially or otherwise, that specify actions to be taken by the machine 500. Further, while a single machine 500 is illustrated, the term "machine" shall also be taken to include a collection of machines that individually or jointly execute the instructions 502 to perform any one or more of the methodologies discussed herein. The machine 500, for example, may comprise the user system 102 or any one of multiple server devices forming part of the server system 110. In some examples, the machine 500 may also comprise both client and server systems, with certain operations of a particular method or algorithm being performed on the server-side and with certain operations of the method or algorithm being performed on the client-side.

The machine 500 may include processors 504, memory 506, and input/output I/O components 508, which may be configured to communicate with each other via a bus 510.

The memory 506 includes a main memory 516, a static memory 518, and a storage unit 520, both accessible to the processors 504 via the bus 510. The main memory 506, the static memory 518, and storage unit 520 store the instructions 502 embodying any one or more of the methodologies or functions described herein. The instructions 502 may also reside, completely or partially, within the main memory 516, within the static memory 518, within machine-readable medium 522 within the storage unit 520, within at least one of the processors 504 (e.g., within the processor's cache memory), or any suitable combination thereof, during execution thereof by the machine 500.

The I/O components 508 may include a wide variety of components to receive input, provide output, produce output, transmit information, exchange information, capture measurements, and so on. The specific I/O components 508 that are included in a particular machine will depend on the type of machine. For example, portable machines such as mobile phones may include a touch input device or other such input mechanisms, while a headless server machine will likely not include such a touch input device. It will be appreciated that the I/O components 508 may include many other components that are not shown in FIG. 5. In various examples, the I/O components 508 may include user output components 524 and user input components 526. The user output components 524 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

The motion components 530 include acceleration sensor components (e.g., accelerometer), gravitation sensor components, rotation sensor components (e.g., gyroscope).

The environmental components 532 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be modified with digital effect data (e.g., filters) described above. The rear cameras may, for example, be used to capture still images and videos in a more traditional camera mode, with these images similarly being modified with digital effect data. In addition to front and rear cameras, the user system 102 may also include a 360° camera for capturing 360° photographs and videos.

Moreover, the camera system of the user system 102 may be equipped with advanced multi-camera configurations. This may include dual rear cameras, which might consist of a primary camera for general photography and a depth-sensing camera for capturing detailed depth information in a scene. This depth information can be used for various purposes, such as creating a bokeh effect in portrait mode, where the subject is in sharp focus while the background is blurred. In addition to dual camera setups, the user system 102 may also feature triple, quad, or even penta camera configurations on both the front and rear sides of the user system 102. These multiple cameras systems may include a wide camera, an ultra-wide camera, a telephoto camera, a macro camera, and a depth sensor, for example.

Communication may be implemented using a wide variety of technologies. The I/O components 508 further include communication components 536 operable to couple the machine 500 to a network 538 or devices 540 via respective coupling or connections. For example, the communication components 536 may include a network interface component or another suitable device to interface with the network 538. In further examples, the communication components 536 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 540 may be another machine or any of a wide variety of peripheral devices (e.g., a peripheral device coupled via a USB).

Moreover, the communication components 536 may detect identifiers or include components operable to detect identifiers. For example, the communication components 536 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 536, such as location via Internet Protocol (IP) geolocation, location via Wi-Fi® signal triangulation, location via detecting an NFC beacon signal that may indicate a particular location, and so forth.

The various memories (e.g., main memory 516, static memory 518, and memory of the processors 504) and storage unit 520 may store one or more sets of instructions and data structures (e.g., software) embodying or used by any one or more of the methodologies or functions described herein. These instructions (e.g., the instructions 502), when executed by processors 504, cause various operations to implement the disclosed examples.

The instructions 502 may be transmitted or received over the network 538, using a transmission medium, via a network interface device (e.g., a network interface component included in the communication components 536) and using any one of several well-known transfer protocols (e.g., hypertext transfer protocol (HTTP)). Similarly, the instructions 502 may be transmitted or received using a transmission medium via a coupling (e.g., a peer-to-peer coupling) to the devices 540.

Software Architecture

Figure 6:
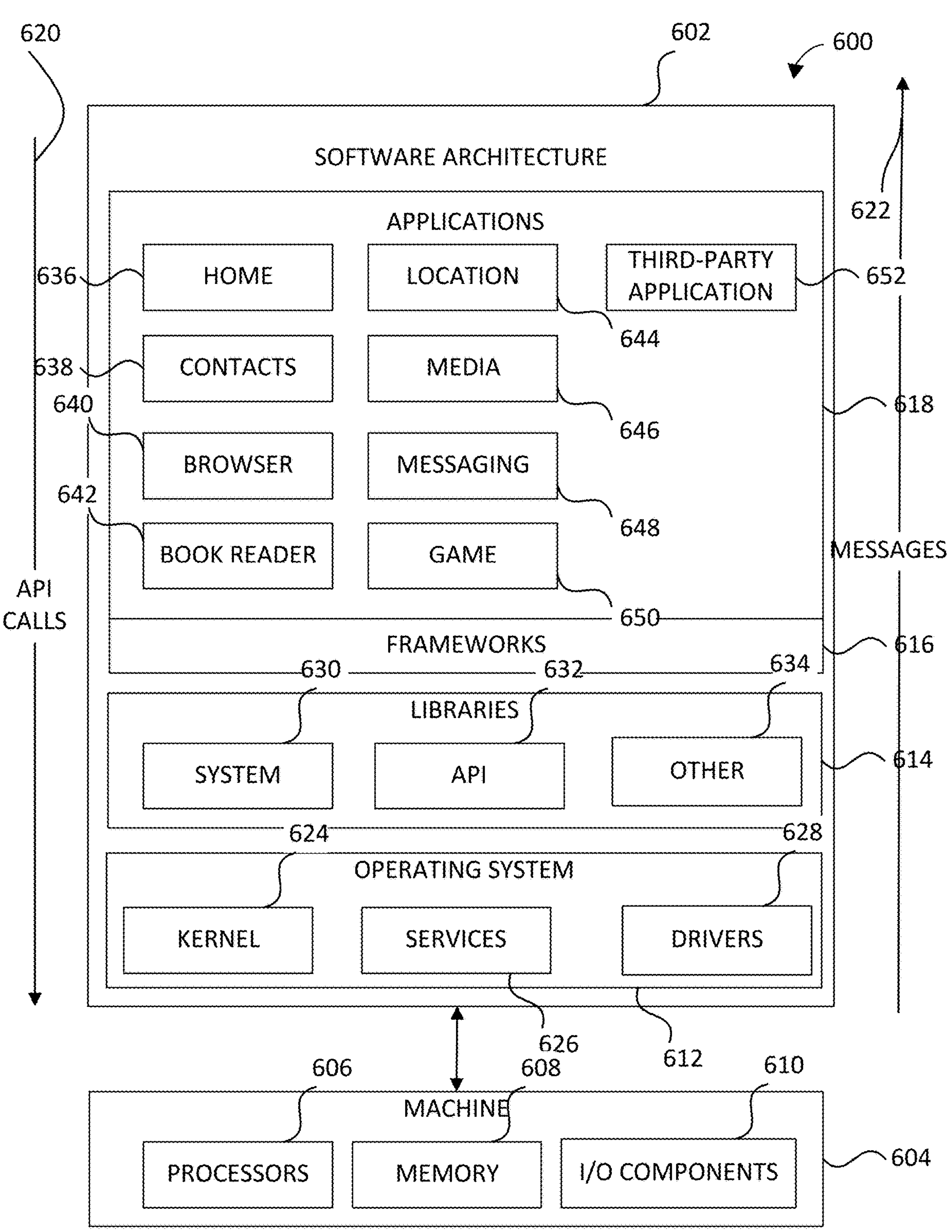
FIG. 6 is a block diagram depicting the software architecture of a computing device, showing various applications, frameworks, and system components, consistent with some embodiments.

FIG. 6 is a block diagram 600 illustrating a software architecture 602, which can be installed on any one or more of the devices described herein. The software architecture 602 is supported by hardware such as a machine 604 that includes processors 606, memory 608, and I/O components 610. In this example, the software architecture 602 can be conceptualized as a stack of layers, where each layer provides a particular functionality. The software architecture 602 includes layers such as an operating system 612, libraries 614, frameworks 616, and applications 618. Operationally, the applications 618 invoke API calls 620 through the software stack and receive messages 622 in response to the API calls 620.

The operating system 612 manages hardware resources and provides common services. The operating system 612 includes, for example, a kernel 624, services 626, and drivers 628. The kernel 624 acts as an abstraction layer between the hardware and the other software layers. For example, the kernel 624 provides memory management, processor management (e.g., scheduling), component management, networking, and security settings, among other functionalities. The services 626 can provide other common services for the other software layers. The drivers 628 are responsible for controlling or interfacing with the underlying hardware. For instance, the drivers 628 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 614 provide a common low-level infrastructure used by the applications 618. The libraries 614 can include system libraries 630 (e.g., C standard library) that provide functions such as memory allocation functions, string manipulation functions, mathematical functions, and the like. In addition, the libraries 614 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 614 can also include a wide variety of other libraries 634 to provide many other APIs to the applications 618.

The frameworks 616 provide a common high-level infrastructure that is used by the applications 618. For example, the frameworks 616 provide various graphical user interface (GUI) functions, high-level resource management, and high-level location services. The frameworks 616 can provide a broad spectrum of other APIs that can be used by the applications 618, some of which may be specific to a particular operating system or platform.

In an example, the applications 618 may include a home application 636, a contacts application 638, a browser application 640, a book reader application 642, a location application 644, a media application 646, a messaging application 648, a game application 650, and a broad assortment of other applications such as a third-party application 652. The applications 618 are programs that execute functions defined in the programs. Various programming languages can be employed to create one or more of the applications 618, structured in a variety of manners, such as object-oriented programming languages (e.g., Objective-C, Java, or C++) or procedural programming languages (e.g., C or assembly language). In a specific example, the third-party application 652 (e.g., an application developed using the ANDROID™ or IOS™ software development kit (SDK) by an entity other than the vendor of a platform) may be mobile software running on a mobile operating system such as IOS™, ANDROID™, WINDOWS® Phone, or another mobile operating system. In this example, the third-party application 652 can invoke the API calls 620 provided by the operating system 612 to facilitate functionalities described herein.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number may also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

The various features, operations, or processes described herein may be used independently of one another, or may be combined in various ways. All possible combinations and sub-combinations are intended to fall within the scope of this disclosure. In addition, certain method or process blocks may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

EXAMPLES

Example 1 is an augmented reality device configured to generate a final gesture detection signal for hand gesture detection, the augmented reality device comprising: a display; a processor; two or more image sensors; a memory storing instructions thereon, which, when executed by the processor, cause the augmented reality device to perform operations comprising: generating a fused gesture detection signal by combining outputs from hand gesture detectors associated with different modalities, wherein each modality corresponds to a different type of image sensor, and wherein the hand gesture detectors analyze movements of a hand captured in images by the respective image sensors to detect potential hand gestures; processing the fused gesture detection signal to generate the final gesture detection signal, by: suppressing the fused gesture detection signal based on a determination that a velocity of the hand exceeds a predetermined velocity threshold.

In Example 2, the subject matter of Example 1 includes, wherein the fused gesture detection signal is a hand gesture trigger signal indicating the beginning of a hand gesture and suppressing the fused gesture detection signal comprises: suppressing a potential hand gesture trigger based on a determination that the velocity of the hand has exceeded the predetermined velocity threshold, wherein the predetermined velocity threshold is determined based on a system-dependent velocity at which gesture detection becomes unreliable due to motion blur caused by high hand velocity.

In Example 3, the subject matter of Examples 1-2 includes, wherein the fused gesture detection signal is a hand gesture trigger signal indicating the beginning of a hand gesture, and suppressing the fused gesture detection signal comprises: suppressing the fused gesture detection signal based on detecting that a position of the hand is within a predefined region around edges of fields of view of the image sensors, wherein the predefined region is determined based on areas where gesture detection accuracy is reduced due to partial visibility of the hand.

In Example 4, the subject matter of Examples 1-3 includes, wherein the fused gesture detection signal is a hand gesture trigger signal indicating the beginning of a hand gesture, and suppressing the fused gesture detection signal comprises: suppressing the fused gesture detection signal based on detecting that one or more key landmarks of the hand are not visible, wherein the one or more key landmarks of the hand comprise specific joints or fingertips that are used for recognizing the particular hand gesture being detected.

In Example 5, the subject matter of Examples 1-4 includes, wherein the fused gesture detection signal is a hand gesture release signal indicating the end of a hand gesture, and suppressing the fused gesture detection signal comprises: suppressing a potential hand gesture release based on a determination that the velocity of the hand has exceeded the predetermined velocity threshold, wherein the predetermined velocity threshold is determined based on a system-dependent velocity at which gesture detection becomes unreliable due to motion blur caused by high hand velocity.

In Example 6, the subject matter of Examples 1-5 includes, wherein the fused gesture detection signal is a hand gesture release signal indicating the end of a hand gesture, and suppressing the fused gesture detection signal comprises: suppressing the fused gesture detection signal based on detecting that a position of the hand is within a predefined region around edges of fields of view of the image sensors, wherein the predefined region is determined based on areas where gesture detection accuracy is reduced due to partial visibility of the hand.

In Example 7, the subject matter of Examples 1-6 includes, wherein the fused gesture detection signal is a hand gesture release signal indicating the end of a hand gesture, and processing the fused gesture detection signal to generate the final gesture detection signal further comprises: suppressing the fused gesture detection signal based on detecting that one or more key landmarks of the hand are not visible, wherein the one or more key landmarks of the hand comprise specific joints or fingertips that are used for recognizing the particular hand gesture being released.

In Example 8, the subject matter of Examples 1-7 includes, wherein the operations further comprise: maintaining an active gesture state for a predetermined time period when the hand temporarily moves outside a combined field of view of the two or more image sensors.

Example 9 is a method for generating a final gesture detection signal for hand gesture detection in an augmented reality (AR) system, the method comprising: generating a fused gesture detection signal by combining outputs from hand gesture detectors associated with different modalities, wherein each modality corresponds to a different type of image sensor, and wherein the hand gesture detectors analyze movements of a hand captured in images by respective image sensors to detect potential hand gestures; processing the fused gesture detection signal to generate the final gesture detection signal, by: suppressing the fused gesture detection signal based on a determination that a velocity of the hand exceeds a predetermined velocity threshold.

In Example 10, the subject matter of Example 9 includes, wherein the fused gesture detection signal is a hand gesture trigger signal indicating the beginning of a hand gesture and suppressing the fused gesture detection signal comprises: suppressing a potential hand gesture trigger based on a determination that the velocity of the hand has exceeded the predetermined velocity threshold, wherein the predetermined velocity threshold is determined based on a system-dependent velocity at which gesture detection becomes unreliable due to motion blur caused by high hand velocity.

In Example 11, the subject matter of Examples 9-10 includes, wherein the fused gesture detection signal is a hand gesture trigger signal indicating the beginning of a hand gesture, and suppressing the fused gesture detection signal comprises: suppressing the fused gesture detection signal based on detecting that a position of the hand is within a predefined region around edges of fields of view of the image sensors, wherein the predefined region is determined based on areas where gesture detection accuracy is reduced due to partial visibility of the hand.

In Example 12, the subject matter of Examples 9-11 includes, wherein the fused gesture detection signal is a hand gesture trigger signal indicating the beginning of a hand gesture, and suppressing the fused gesture detection signal comprises: suppressing the fused gesture detection signal based on detecting that one or more key landmarks of the hand are not visible, wherein the one or more key landmarks of the hand comprise specific joints or fingertips that are used for recognizing the particular hand gesture being detected.

In Example 13, the subject matter of Examples 9-12 includes, wherein the fused gesture detection signal is a hand gesture release signal indicating the end of a hand gesture, and suppressing the fused gesture detection signal comprises: suppressing a potential hand gesture release based on a determination that the velocity of the hand has exceeded the predetermined velocity threshold, wherein the predetermined velocity threshold is determined based on a system-dependent velocity at which gesture detection becomes unreliable due to motion blur caused by high hand velocity.

In Example 14, the subject matter of Examples 9-13 includes, wherein the fused gesture detection signal is a hand gesture release signal indicating the end of a hand gesture, and suppressing the fused gesture detection signal comprises: suppressing the fused gesture detection signal based on detecting that a position of the hand is within a predefined region around edges of fields of view of the image sensors, wherein the predefined region is determined based on areas where gesture detection accuracy is reduced due to partial visibility of the hand.

In Example 15, the subject matter of Examples 9-14 includes, wherein the fused gesture detection signal is a hand gesture release signal indicating the end of a hand gesture, and processing the fused gesture detection signal to generate the final gesture detection signal further comprises: suppressing the fused gesture detection signal based on detecting that one or more key landmarks of the hand are not visible, wherein the one or more key landmarks of the hand comprise specific joints or fingertips that are used for recognizing the particular hand gesture being released.

In Example 16, the subject matter of Examples 9-15 includes, maintaining an active gesture state for a predetermined time period when the hand temporarily moves outside a combined field of view of the image sensors.

Example 17 is an augmented reality device configured to generate a final gesture detection signal for hand gesture detection, the augmented reality device comprising: means for generating a fused gesture detection signal by combining outputs from hand gesture detectors associated with different modalities, wherein each modality corresponds to a different type of image sensor, and wherein the hand gesture detectors analyze movements of a hand captured in images by the respective image sensors to detect potential hand gestures; means for processing the fused gesture detection signal to generate the final gesture detection signal by suppressing the fused gesture detection signal based on a determination that a velocity of the hand exceeds a predetermined velocity threshold.

In Example 18, the subject matter of Example 17 includes, wherein the fused gesture detection signal is a hand gesture trigger signal indicating the beginning of a hand gesture, and wherein the means for suppressing the fused gesture detection signal comprises: means for suppressing the fused gesture detection signal based on detecting that a position of the hand is within a predefined region around edges of fields of view of the image sensors, wherein the predefined region is determined based on areas where gesture detection accuracy is reduced due to partial visibility of the hand.

In Example 19, the subject matter of Examples 17-18 includes, wherein the fused gesture detection signal is a hand gesture release signal indicating the end of a hand gesture, and wherein the means for processing the fused gesture detection signal to generate the final gesture detection signal further comprises: means for suppressing the fused gesture detection signal based on detecting that one or more key landmarks of the hand are not visible, wherein the one or more key landmarks of the hand comprise specific joints or fingertips that are used for recognizing the particular hand gesture being released.

In Example 20, the subject matter of Examples 17-19 includes, wherein the means for performing operations further comprises: means for maintaining an active gesture state for a predetermined time period when the hand temporarily moves outside a combined field of view of the two or more image sensors.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components, also referred to as "computer-implemented." Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. An augmented reality (AR) device configured to generate a final gesture detection signal for hand gesture detection, the AR device comprising:

a display;

a processor;

two or more image sensors;

a memory storing instructions thereon, which, when executed by the processor, cause the AR device to perform operations comprising:

generating a fused gesture detection signal by combining outputs from hand gesture detectors associated with different modalities, wherein each modality corresponds to a different type of image sensor, and wherein the hand gesture detectors analyze movements of a hand captured in images by the respective image sensors to detect potential hand gestures;

processing the fused gesture detection signal to generate the final gesture detection signal, by:

suppressing the fused gesture detection signal based on a determination that a velocity of the hand exceeds a predetermined velocity threshold.

2. The AR device of claim 1, wherein the fused gesture detection signal is a hand gesture trigger signal indicating the beginning of a hand gesture and suppressing the fused gesture detection signal comprises:

suppressing a potential hand gesture trigger based on a determination that the velocity of the hand has exceeded the predetermined velocity threshold, wherein the predetermined velocity threshold is determined based on a system-dependent velocity at which gesture detection becomes unreliable due to motion blur caused by high hand velocity.

3. The AR device of claim 1, wherein the fused gesture detection signal is a hand gesture trigger signal indicating the beginning of a hand gesture, and suppressing the fused gesture detection signal comprises:

suppressing the fused gesture detection signal based on detecting that a position of the hand is within a predefined region around edges of fields of view of the image sensors, wherein the predefined region is determined based on areas where gesture detection accuracy is reduced due to partial visibility of the hand.

4. The AR device of claim 1, wherein the fused gesture detection signal is a hand gesture trigger signal indicating the beginning of a hand gesture, and suppressing the fused gesture detection signal comprises:

suppressing the fused gesture detection signal based on detecting that one or more key landmarks of the hand are not visible, wherein the one or more key landmarks of the hand comprise specific joints or fingertips that are used for recognizing the particular hand gesture being detected.

5. The AR device of claim 1, wherein the fused gesture detection signal is a hand gesture release signal indicating the end of a hand gesture, and suppressing the fused gesture detection signal comprises:

suppressing a potential hand gesture release based on a determination that the velocity of the hand has exceeded the predetermined velocity threshold, wherein the predetermined velocity threshold is determined based on a system-dependent velocity at which gesture detection becomes unreliable due to motion blur caused by high hand velocity.

6. The AR device of claim 1, wherein the fused gesture detection signal is a hand gesture release signal indicating the end of a hand gesture, and suppressing the fused gesture detection signal comprises:

suppressing the fused gesture detection signal based on detecting that a position of the hand is within a predefined region around edges of fields of view of the image sensors, wherein the predefined region is determined based on areas where gesture detection accuracy is reduced due to partial visibility of the hand.

7. The AR device of claim 1, wherein the fused gesture detection signal is a hand gesture release signal indicating the end of a hand gesture, and processing the fused gesture detection signal to generate the final gesture detection signal further comprises:

suppressing the fused gesture detection signal based on detecting that one or more key landmarks of the hand are not visible, wherein the one or more key landmarks of the hand comprise specific joints or fingertips that are used for recognizing the particular hand gesture being released.

8. The AR device of claim 1, wherein the operations further comprise:

maintaining an active gesture state for a predetermined time period when the hand temporarily moves outside a combined field of view of the two or more image sensors; or maintaining an active gesture state for a predetermined time period when the hand is no longer detected by a hand tracker within a combined field of view of the two or more image sensors.

9. A method for generating a final gesture detection signal for hand gesture detection in an augmented reality (AR) system, the method comprising:

generating a fused gesture detection signal by combining outputs from hand gesture detectors associated with different modalities, wherein each modality corresponds to a different type of image sensor, and wherein the hand gesture detectors analyze movements of a hand captured in images by respective image sensors to detect potential hand gestures;

processing the fused gesture detection signal to generate the final gesture detection signal, by:

suppressing the fused gesture detection signal based on a determination that a velocity of the hand exceeds a predetermined velocity threshold.

10. The method of claim 9, wherein the fused gesture detection signal is a hand gesture trigger signal indicating the beginning of a hand gesture and suppressing the fused gesture detection signal comprises:

suppressing a potential hand gesture trigger based on a determination that the velocity of the hand has exceeded the predetermined velocity threshold, wherein the predetermined velocity threshold is determined based on a system-dependent velocity at which gesture detection becomes unreliable due to motion blur caused by high hand velocity.

11. The method of claim 9, wherein the fused gesture detection signal is a hand gesture trigger signal indicating the beginning of a hand gesture, and suppressing the fused gesture detection signal comprises:

suppressing the fused gesture detection signal based on detecting that a position of the hand is within a predefined region around edges of fields of view of the image sensors, wherein the predefined region is determined based on areas where gesture detection accuracy is reduced due to partial visibility of the hand.

12. The method of claim 9, wherein the fused gesture detection signal is a hand gesture trigger signal indicating the beginning of a hand gesture, and suppressing the fused gesture detection signal comprises:

suppressing the fused gesture detection signal based on detecting that one or more key landmarks of the hand are not visible, wherein the one or more key landmarks of the hand comprise specific joints or fingertips that are used for recognizing the particular hand gesture being detected.

13. The method of claim 9, wherein the fused gesture detection signal is a hand gesture release signal indicating the end of a hand gesture, and suppressing the fused gesture detection signal comprises:

suppressing a potential hand gesture release based on a determination that the velocity of the hand has exceeded the predetermined velocity threshold, wherein the predetermined velocity threshold is determined based on a system-dependent velocity at which gesture detection becomes unreliable due to motion blur caused by high hand velocity.

14. The method of claim 9, wherein the fused gesture detection signal is a hand gesture release signal indicating the end of a hand gesture, and suppressing the fused gesture detection signal comprises:

suppressing the fused gesture detection signal based on detecting that a position of the hand is within a predefined region around edges of fields of view of the image sensors, wherein the predefined region is determined based on areas where gesture detection accuracy is reduced due to partial visibility of the hand.

15. The method of claim 9, wherein the fused gesture detection signal is a hand gesture release signal indicating the end of a hand gesture, and processing the fused gesture detection signal to generate the final gesture detection signal further comprises:

suppressing the fused gesture detection signal based on detecting that one or more key landmarks of the hand are not visible, wherein the one or more key landmarks of the hand comprise specific joints or fingertips that are used for recognizing the particular hand gesture being released.

16. The method of claim 9, further comprising:

maintaining an active gesture state for a predetermined time period when the hand temporarily moves outside a combined field of view of the image sensors; or maintaining an active gesture state for a predetermined time period when the hand is no longer detected by a hand tracker within a combined field of view of the two or more image sensors.

17. An augmented reality (AR) device configured to generate a final gesture detection signal for hand gesture detection, the AR device comprising:

means for generating a fused gesture detection signal by combining outputs from hand gesture detectors associated with different modalities, wherein each modality corresponds to a different type of image sensor, and wherein the hand gesture detectors analyze movements of a hand captured in images by the respective image sensors to detect potential hand gestures;

means for processing the fused gesture detection signal to generate the final gesture detection signal by suppressing the fused gesture detection signal based on a determination that a velocity of the hand exceeds a predetermined velocity threshold.

18. The AR device of claim 17, wherein the fused gesture detection signal is a hand gesture trigger signal indicating the beginning of a hand gesture, and wherein the means for suppressing the fused gesture detection signal comprises:

means for suppressing the fused gesture detection signal based on detecting that a position of the hand is within a predefined region around edges of fields of view of the image sensors, wherein the predefined region is determined based on areas where gesture detection accuracy is reduced due to partial visibility of the hand.

19. The AR device of claim 17, wherein the fused gesture detection signal is a hand gesture release signal indicating the end of a hand gesture, and wherein the means for processing the fused gesture detection signal to generate the final gesture detection signal further comprises:

means for suppressing the fused gesture detection signal based on detecting that one or more key landmarks of the hand are not visible, wherein the one or more key landmarks of the hand comprise specific joints or fingertips that are used for recognizing the particular hand gesture being released.

20. The AR device of claim 17, wherein the means for performing operations further comprises:

means for maintaining an active gesture state for a predetermined time period when the hand temporarily moves outside a combined field of view of the two or more image sensors.

* * * * *